(12) United States Patent
Farkas et al.

(10) Patent No.: US 6,928,561 B2
(45) Date of Patent: Aug. 9, 2005

(54) SYSTEM AND METHOD FOR PROVIDING A POWER SUPPLY DUAL REMOTE SENSE

(75) Inventors: Sandor T. Farkas, Pflugerville, TX (US); Quy N. Hoang, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 631 days.

(21) Appl. No.: 10/075,699

(22) Filed: Feb. 14, 2002

(65) Prior Publication Data

US 2003/0154415 A1 Aug. 14, 2003

(51) Int. Cl.[7] .............................. G06F 1/26; G05F 1/618
(52) U.S. Cl. ........................ 713/300; 713/340; 323/280
(58) Field of Search ................................. 713/300, 340, 713/310; 326/121; 363/16; 323/280

(56) References Cited

U.S. PATENT DOCUMENTS

| | | | |
|---|---|---|---|
| 3,725,740 A | * 4/1973 | Kuster ........................... 361/56 |
| 4,187,535 A | * 2/1980 | Wigley et al. ................ 363/16 |
| 5,752,077 A | * 5/1998 | Yiu et al. ....................... 710/7 |
| 5,961,647 A | 10/1999 | Kim et al. ................... 713/300 |
| 6,003,139 A | 12/1999 | McKenzie ................... 713/300 |
| 6,055,647 A | 4/2000 | Lacombe et al. ............. 714/14 |
| 6,081,752 A | 6/2000 | Benson, IV et al. .......... 700/79 |
| 6,097,222 A | * 8/2000 | Lovett ........................ 326/121 |
| 6,181,030 B1 | 1/2001 | Carpenter et al. .......... 307/113 |

FOREIGN PATENT DOCUMENTS

JP          09305245 A   * 11/1997   ............. G05F/1/56

* cited by examiner

*Primary Examiner*—Thomas Lee
*Assistant Examiner*—Suresh Suryawanshi
(74) *Attorney, Agent, or Firm*—Baker Botts L.L.P.

(57) ABSTRACT

A system and method for providing a power supply dual remote sense. A power supply with a positive remote sense input is coupled to first and second load positions. The load positions are each coupled to a pull-down circuit to provide first and second voltages, respectively, to the inputs of the pull-down circuit. The pull-down circuit output is coupled to the positive remote sense input of the power supply. The voltage level of the pull-down circuit output is no greater than either of the first or second voltages provided at its inputs.

21 Claims, 6 Drawing Sheets

FIG 6

SYSTEM AND METHOD FOR PROVIDING A POWER SUPPLY DUAL REMOTE SENSE

TECHNICAL FIELD

The present disclosure relates generally to the field of electronic device power systems and, more particularly, to a system and method of providing a power supply dual remote sense.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include multiple electronic devices that communicate information. Such systems can include physical features that connect to any electronic device having a particular configuration. For example, in a server computer system, circuit boards bearing electronic components (sometimes called expansion cards) that communicate using the PCI local bus can be mounted to expansion connectors in a slot provided for that purpose. Such circuit boards can even connect to further devices. For example, a RAID expansion card can be mounted in a PCI expansion slot and further connected to multiple hard drives. Other devices that communicate with the PCI local bus can be directly mounted on the motherboard. In addition, hard drives and other power-intensive devices can be coupled to the motherboard through a SCSI connection. SCSI is a standard for connection of computer peripherals allowing a number of such devices to be coupled together and to the information handling device using a daisy chain arrangement. The amount of power drawn by such a series of connectors depends upon the type of device mounted in the expansion connectors and the number of such devices mounted in the expansion connectors.

Most expansion cards and SCSI devices are designed to operate based on a power input at a particular voltage. A power supply that would provide the correct voltage to a lightly loaded group of expansion connectors or SCSI connection may not provide the correct voltage for a heavily loaded expansion bus or SCSI connector. Many conventional computer power supplies include a remote sense connection, including both a positive and negative input. In some systems, the remote sense connection is coupled around a variable load (such as a position where a user could install one or more powered devices such as expansion cards) present in the system so that the power supply can react to whether the load is light or heavy and supply a voltage that takes the feedback into account and corrects that remote voltage to a desired level. For example, the power supply can compensate for the voltage drop in the power circuit including cables, connectors and/or PCB layouts. As a result, the devices receive a power input closer to their optimum voltage level.

In some systems, the power circuit includes two or more variable loads. Attaching the remote sense voltage input around one of those loads does not provide any feedback to the power supply regarding the voltage level or other electrical characteristic at the one or more other variable loads. For example, if the remotely sensed load is a series of expansion slots that are empty of expansion cards and the additional load is a SCSI connector with a large number of daisy-chained SCSI devices, the power supply will not receive feedback provided by the heavily loaded SCSI connector. In some systems, the variable load positions are present in different, parallel power circuits. In some cases, it is very important that devices receive the voltage at which they were designed to operate. Some devices operating at inappropriate voltages can have shorter usable life, drain more power, create more heat, and/or malfunction. The overall reliability of a system can be impacted if a critical device, for example a hard drive, malfunctions because it does not receive power in accordance with its specified electrical requirements.

SUMMARY

In accordance with the present disclosure, a method and system is provided for providing a power supply dual remote sense. In one system of the present disclosure, power supply with a positive remote sense input is coupled to first and second load positions. The load positions are each coupled to a pull-down circuit to provide first and second voltages, respectively, to the inputs of the pull-down circuit. The pull-down circuit output is coupled to the positive remote sense input of the power supply. The voltage level of the pull-down circuit output is no greater than either of the first or second voltages provided at its inputs.

A technical advantage of the present disclosure is that power is supplied to at least one load position. Another technical advantage of the present disclosure is that changes in the load of two positions are taken into account in determining parameters of a power supply. Another technical advantage of the present disclosure is that the power supply voltage is modified to optimize the load position having the greater power load. Other technical advantages will be apparent to those of ordinary skill in the art in view of the following specification, claims, and drawings. Various embodiments of the present disclosure obtain only a subset of the advantages set forth. No one advantage is critical to the present disclosure. For example, one embodiment of the present disclosure may only provide the advantage of supplying power to at least one load position, while other embodiments may provide several of the advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a method and system for providing a power supply dual remote sense. In one example implementation, multiple sense inputs are added at various points to one or more power circuits of an information handling system and connected to a sense module. The sense module monitors the voltages received from each sense input and drives either the lowest voltage or the highest voltage out on an output. The output is connected to the remote sense input of a power supply that is coupled to the power circuits.

Figure 1:
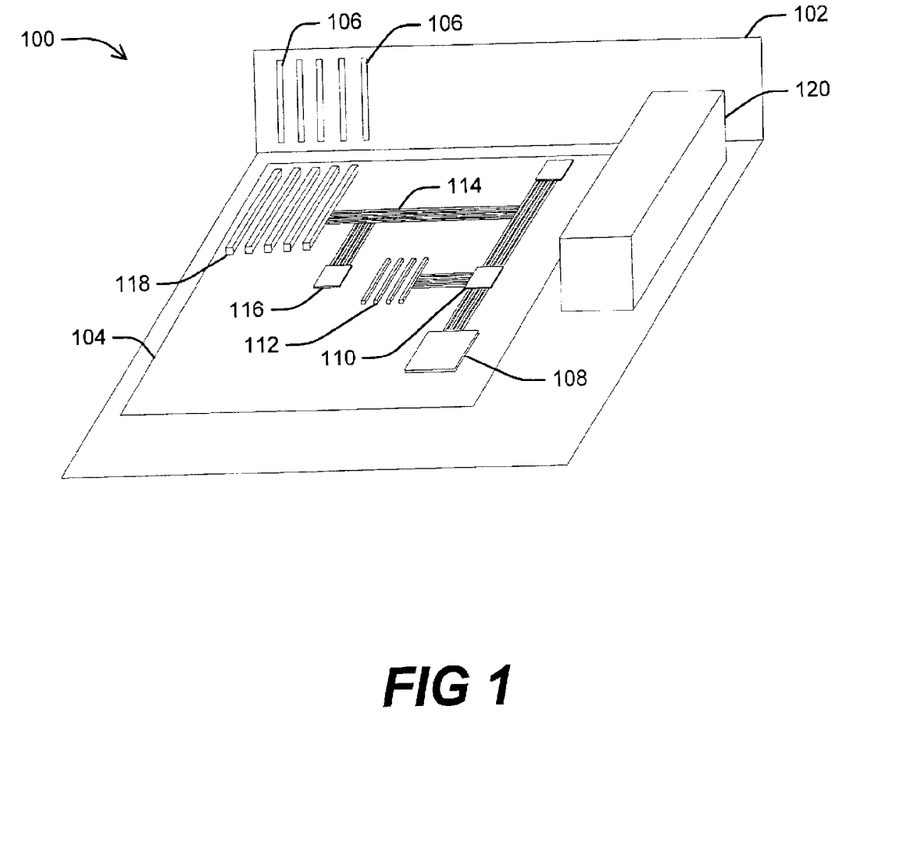
FIG. 1 is a view of an example information handling system.

Shown in FIG. 1 is a diagram of an information handling system, in this case a computer, indicated generally as 100. The computer 100 includes a case or cabinet 102 that provides support for a motherboard 104. The case 102 also includes slots 106 to allow attachment of external connectors to expansion cards mounted in the motherboard 104. Alternative arrangements are also possible. For example, slots 106 can be oriented horizontally rather than vertically. As a further example, the case can be oriented vertically, sometimes referred to as a tower, rather than horizontally.

The motherboard 104 includes a central processing unit or CPU 108. In an alternative configuration, multiple CPUs are included on the motherboard 104. The CPU 108 is coupled to a bridge device 110. The bridge device 110 controls communications between the CPU 108 and the PCI bus 114. The bridge device 110, sometimes referred to as the north bridge, also controls communications between the CPU 108 and random access memory 112. Software running on the computer 100 includes data stored in the memory 112 as well as data stored in registers or cache in the CPU 108. The software is comprised of instructions that are executed by the CPU 108, even if such execution is only giving a command to another device, for example an expansion card. If the CPU 108 gives a command to an expansion card, the communication including that command is sent to the bridge device 110, which takes control of the PCI local bus 114. The bridge device 110 then places the CPU's command on the bus 114. If the command was for an on board chip 116, a chip installed on the motherboard 104 and not easily removable, that on board chip 116 receives the communication, determines that it is the recipient, and carries out the command. For example, if the on board chip 116 is a video chip, it could carry out the command by outputting a signal representing a particular image to an output port that connects to a monitor. If the command was for an expansion card, the expansion connector 118 in which the expansion card is mounted receives the signal and couples it to the expansion card. The expansion card receives the communication, determines that it is the recipient, and carries out the command. For example, if the expansion card is a sound card, it could carry out the command by outputting a signal representing a particular sound to an output port that connects to a speaker.

Different types of expansion cards can require different amounts of power. For example, a network interface card or NIC can require much less power than a RAID card that is connected to multiple hard drives. By changing or adding expansion cards, the customer or user is able to change the power load at the expansion slots 118 long after the computer and its power system has been designed. If an information handling device, such as a computer, is capable of being customized at more than one point in the power circuit, the relative power draw between those load positions is also variable depending upon the changes made by the user. On the other hand, the on board devices, such as the bridge device 110 draw a particular amount of power and are not easily removable or upgradable by the user.

For example, if the on board chip 116 is a second bridge chip, an additional bus could be connected to the PCI bus through that second bridge chip 116. An additional bus can be another PCI bus, sometimes called a peer bus, or a different type of bus, for example EISA. Any of those busses can support communication to expansion connectors or other types of load positions where the user can modify the power load required to be handled by the computer's power system. Other devices that are often included in a computer are not shown. For example, many computers include hard drives that are connected through an IDE or SCSI interface.

A power supply 120 is shown in the case 102 with the motherboard 104. In one implementation, the power supply 120 is attached to the motherboard 104 by a cable. In another implementation, the power supply 120 plugs into the motherboard 104 directly. In one embodiment, the power supply 120 is a high-current power supply that includes one remote sense connection. The remote sense connection allows the power supply to receive feedback and adjust its parameters, often output voltage, in accordance with that feedback. Some power supplies 120 include both a positive and a negative input as the remote sense connection.

Figure 2:
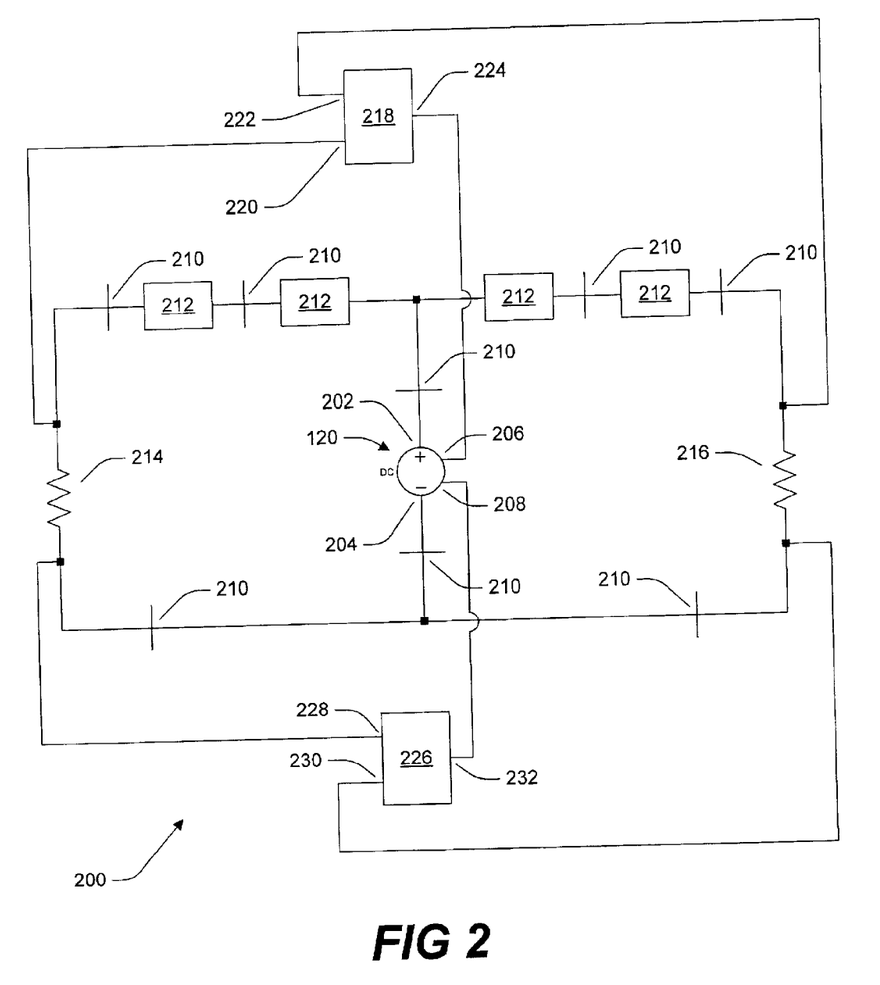
FIG. 2 is a circuit diagram of a power supply circuit for an information handling system.

FIG. 2 is a circuit diagram of a power supply circuit 200 for an information handling system. The power supply 120 has a positive terminal 202 and a negative terminal 204. The power supply is connected to two circuits in parallel. Each circuit includes connectors 210 on both sides of the power supply 120. The left circuit also includes a conductor 212, for example cables or printed circuit board (PCB) layout, a connector 210, a conductor 212, a connector 210, a first load position 214, and a connector 210. While the first load position 214 is shown as a resistor, the electrical characteristics, including the resistance, of the first load position 214 depend upon the devices that are attached at that position. The right circuit also includes a conductor 212, a connector 210, a conductor 212, a connector 210, a second load position 216, and a connector 210. While the second load position 216 is shown as a resistor, the electrical characteristics, including the resistance, of the second load position 216 depend upon the devices that are attached at that position. In one embodiment of the present disclosure, the first load position 214 is a riser card including multiple expansion connectors capable of holding expansion cards, for example PCI cards. In one embodiment of the present disclosure, the second load position 216 is a SCSI connector that is capable of providing a communication and power coupling to one or more SCSI devices, for example SCSI hard drives.

The circuit of FIG. 2 illustrates two sense modules. One sense module is a pull-down circuit 218 that includes inputs 220 and 222 that are coupled through conductive paths to the positive sides of the first load position 214 and the second load position 216, respectively. The pull-down circuit 218 includes an output 224 that is coupled though a conductive path to the positive remote sense input 206 of the power supply 120. The other sense module is a pull-up circuit 226 that includes inputs 228 and 230 that are coupled through conductive paths to the negative sides of the first load position 214 and the second load position 216, respectively. The pull-up circuit 226 includes an output 232 that is coupled though a conductive path to the negative remote sense input 208 of the power supply 120.

In some embodiments of the present disclosure, only one sense module will be included. For example, if the information handling system has very strong grounding such that losses in the negative path are negligible and the first load position 214 and second load position 216 are relatively remote with respect to the positive terminal 202 of the power supply 120, a pull-down circuit 218 can be provided without a pull-up circuit 226.

The pull-down circuit 218 drives the voltage of its output 224 to approximately the lower of the voltages at its two inputs 220 and 222. The pull-up circuit 226 drives the voltage of its output 232 to approximately the higher of the voltages at its two inputs 228 and 230. The power supply 120 receives these voltages and operates in a conventional manner to adjust the parameters of its output at the positive 202 and negative 204 terminals in response. The power supply 120 in this embodiment will increase its output voltage to compensate for the worst-case losses.

Figure 3:
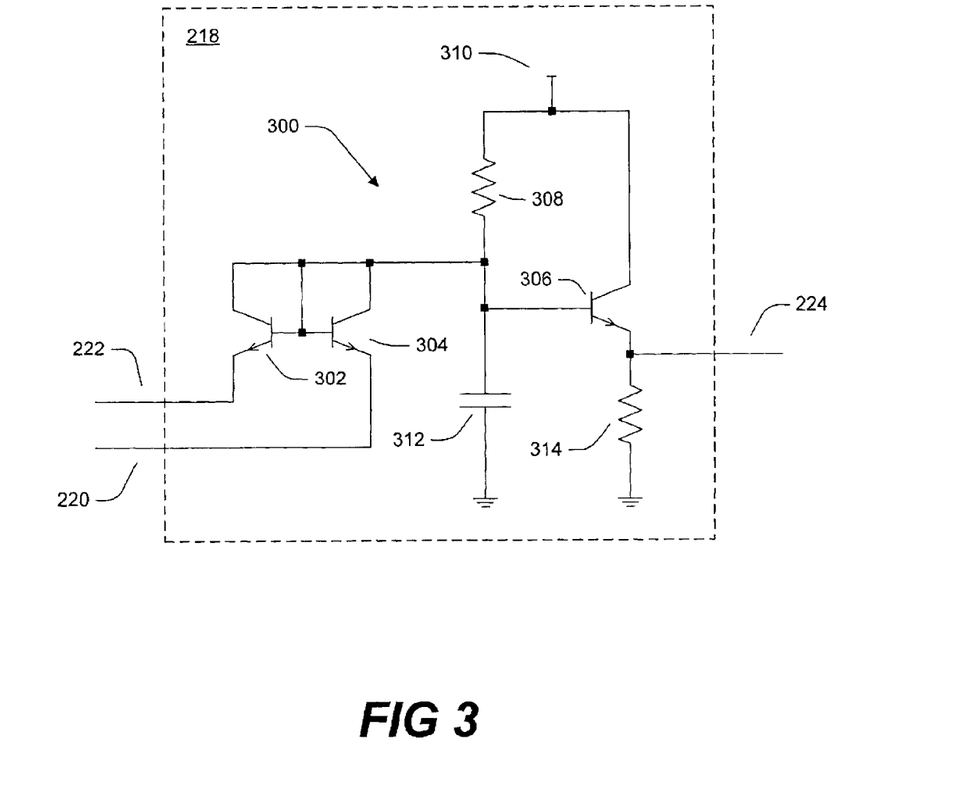
FIG. 3 is a circuit diagram of a pull-down circuit.

FIG. 3 is a circuit diagram of an example pull-down circuit 218. The inputs 220 and 222 of the pull-down circuit 218 are coupled to the emitters of first and second transistors 302 and 304, respectively. The first and second transistors 302 and 304 are connected as diodes with their bases and collectors conductively coupled. Those bases and collectors are also conductively coupled to a set voltage 310, Vcc, through a resistor 308, to ground through a capacitor 312, and to the base of a third transistor 306. The third transistor 306 is coupled to Vcc 310 at its collector and is coupled to ground through a resister 314 at its emitter. The output 224 is coupled to the emitter of the third transistor 306.

When the voltage of one of the inputs 220 and 222 is lower than the other, the transistor connected to that input draws current through the resistor 308. As current flows through that resistor 308, the voltage on the capacitor 312 and thus the voltage on the base of the third transistor 306 is lowered. The voltage at the output 224 is a buffered copy of the voltage on the capacitor 312. In one embodiment, the three transistors have very high gain and are well matched in Vbe characteristics so that the voltage at the output 224 tracks the lower of the voltages at the inputs 220 and 222. The presence of the capacitor 312 and the third transistor 306 filter out some unwanted noise received from the sense inputs 220 and 222 or the Vcc 310. The values of the components can be chosen taking into account variables including the anticipated level of noise, the range of voltages anticipated at the inputs, and the available Vcc levels. In one specific embodiment, the resistor 308 has a resistance of 3 kΩ, the resistor 314 has a resistance of 2.2 kΩ, the capacitor has a capacitance of 0.1 $\mu$F, the Vcc is positive 12 V, and the a voltage of approximately 5V is anticipated at the inputs of the circuit. Simulations have indicated that well matched components can result in an output voltage that does not exceed the lower of the input voltages and does not deviate from the lower voltage of the inputs by more than 1%

In alternative embodiments of the present invention, more than two inputs can be monitored by the pull-down circuit 216. Each additional input can be coupled to the emitter of an additional transistor. That transistor would then be coupled at the base and collector to the base of the third transistor 306. The output 224 would then be a buffered copy of the lowest voltage present on any of the inputs. In another embodiment of the present disclosure, the circuit of FIG. 3 is modified to provide a pull-up circuit as would be apparent to one of ordinary skill.

Figure 4:
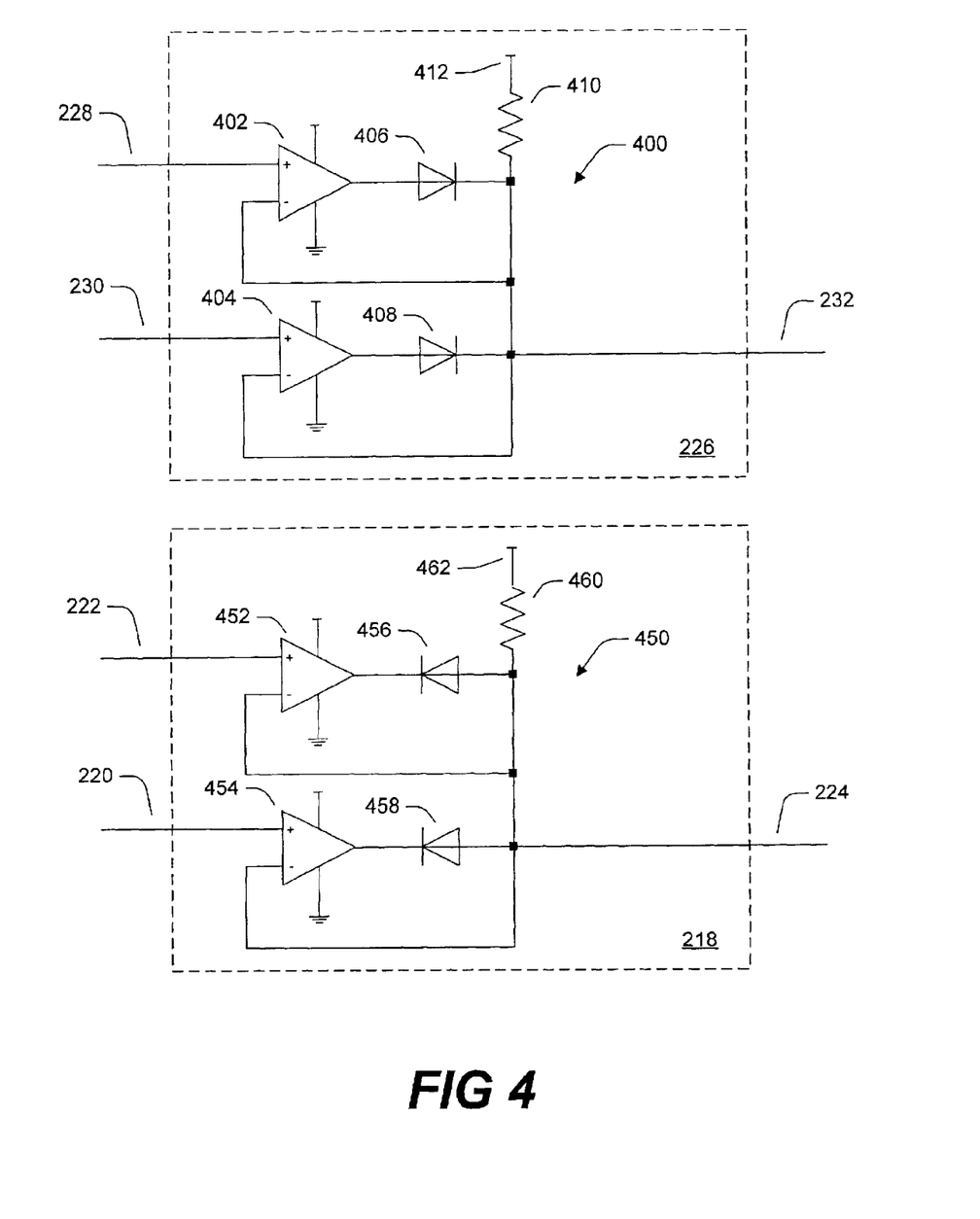
FIG. 4 is a circuit diagram of pull-down and pull-up circuits.

FIG. 4 is an internal circuit diagram of a pull-down circuit 218 and a pull-up circuit 226 according to another embodiment of the present disclosure. The pull-down circuit 218 includes two inputs 220 and 222 conductively coupled to an internal operational amplifier circuit 450. The inputs are received at the positive inputs of two operational amplifiers 452 and 454 (op amps). Each of the op amps 452 and 454 is coupled to a diode 456 and 458, respectively, that couples the output of the op amp to the output 224 of the pull-down circuit 218. The diodes 456 and 458 are each oriented to allow current flow toward the op amp output. The output 224 of the pull-down circuit 218 is also connected to Vcc 462 through a resistor 460. When one of the inputs 220 and 222 is less than the other, that op amp pulls current through the resistor 460 to lower the voltage of the output 224 to equalize that op amp's inputs. The other op amp cannot push current due to the diode.

The pull-up circuit 226 includes two inputs 228 and 230 conductively coupled to an internal operational amplifier circuit 400. The inputs are received at the positive inputs of two operational amplifiers 402 and 404 (op amps). Each of the op amps 402 and 404 is coupled to a diode 406 and 408, respectively, that couples the output of the op amp to the output 232 of the pull-up circuit 226. The diodes 406 and 408 are each oriented to allow current flow away from the op amp output. The output 232 of the pull-up circuit 226 is also connected to Vcc 412 through a resistor 410. When one of the inputs 228 and 230 is greater than the other, that op amp pushes current through the resistor 410 to raise the voltage of the output 232 to equalize that op amp's inputs. The other op amp cannot pull current due to the diode.

The components used in the internal circuits 400 and 450 shown in FIG. 4 can be adjusted to match several factors. Those factors could include the anticipated level of noise, the range of voltages anticipated at the inputs, and the available Vcc levels. A sense module employing op amps will tend to follow the lower or higher voltage (depending on whether the circuit is a pull-down or pull-up circuit) more closely than the embodiment of FIG. 3.

Figure 5:
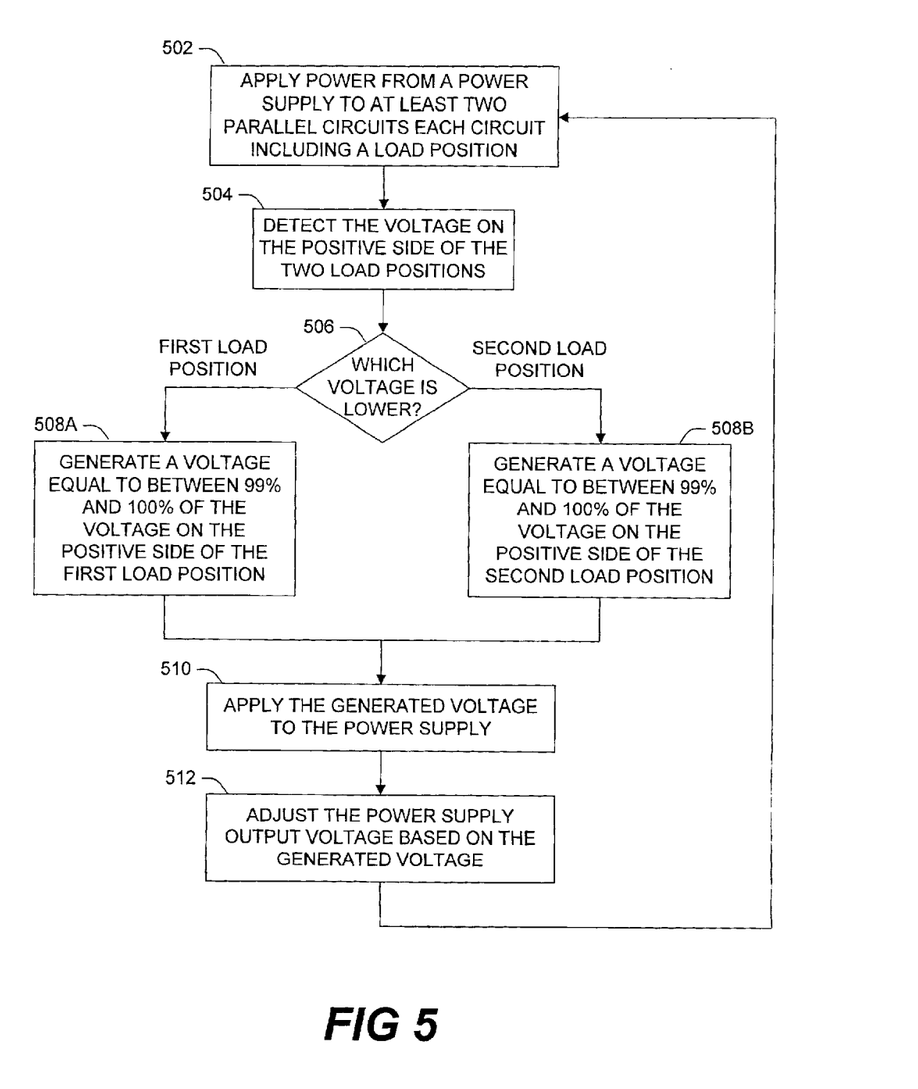
FIG. 5 is a flow diagram of a method for providing feedback to a power supply.

FIG. 5 is a flow diagram of a method for providing feedback to a power supply. The disclosed method can be performed with the structure disclosed in FIGS. 2–4 or with other structure for powering an information handling system. A power supply applies power to at least two circuits, each circuit having a load position 502. In a more specific embodiment, the circuits are parallel. The voltage on the positive side of each of the two load positions is detected 504. The method determines which detected voltage is lower 506. If the voltage detected at the first load position is lower, a voltage equal to between 99% and 100% of that voltage is generated 508A. If the voltage detected at the second load position is lower, a voltage equal to between 99% and 100% of that voltage is generated 508B. The generated voltage is applied to the power supply 510. In a more specific embodiment, the voltage is applied at the positive remote sense connection of the power supply. The power supply adjusts its output based on the generated voltage 512. The method then continues to apply power and monitor the voltages 502.

Figure 6:
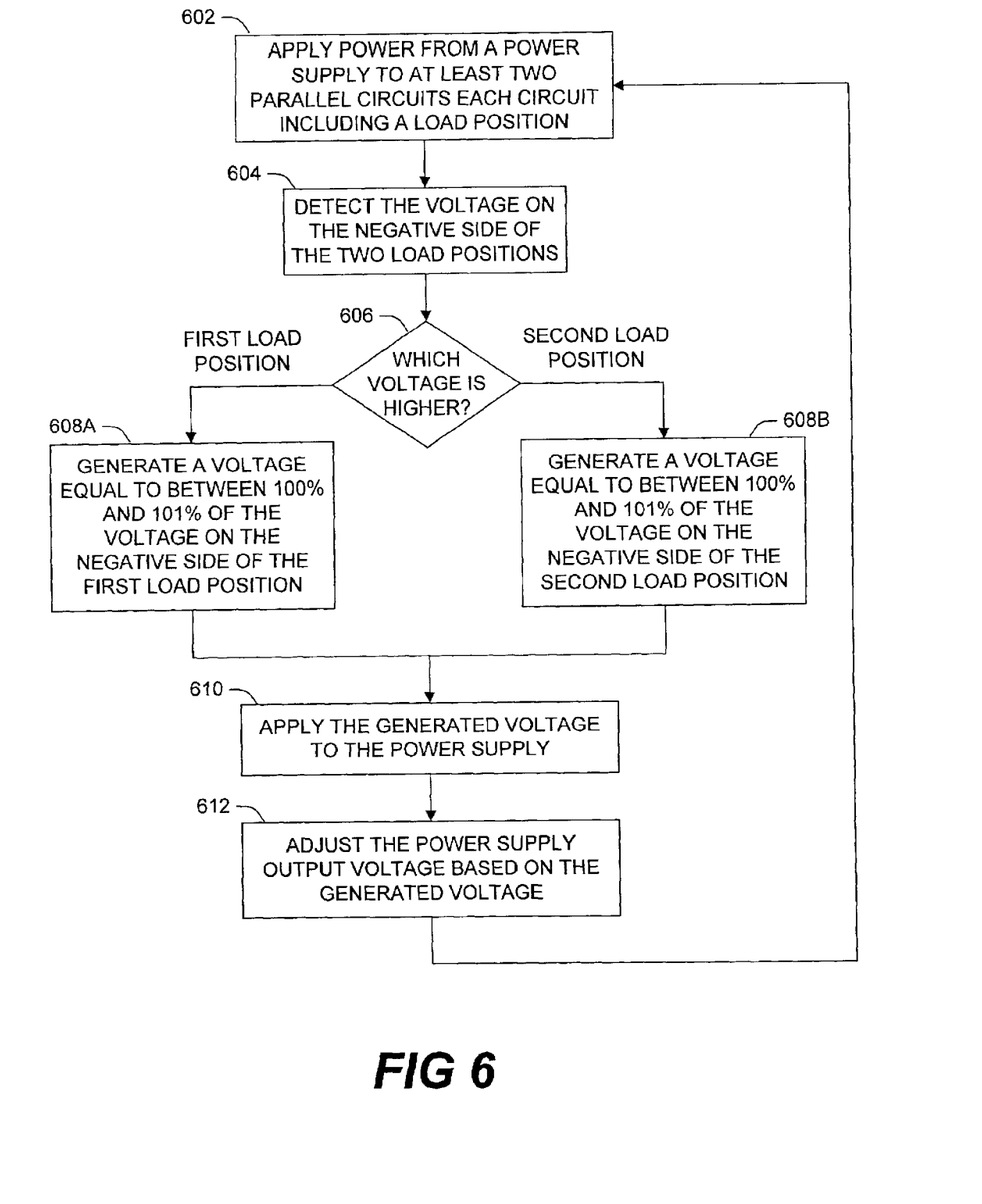
FIG. 6 is a flow diagram of a method for providing feedback to a power supply.

FIG. 6 is a flow diagram of a method for providing feedback to a power supply. The disclosed method can be performed with the structure disclosed in FIGS. 2–4 or with other structure for powering an information handling system. A power supply applies power to at least two circuits, each circuit having a load position 602. In a more specific embodiment, the circuits are parallel. The voltage on the negative side of each of the two load positions is detected 604. The method determines which detected voltage is higher 606. If the voltage detected at the first load position is higher, a voltage equal to between 100% and 101% of that voltage is generated 608A. If the voltage detected at the second load position is higher, a voltage equal to between 100% and 101% of that voltage is generated 608B. The generated voltage is applied to the power supply 610. In a more specific embodiment, the voltage is applied at the negative remote sense connection of the power supply. The power supply adjusts its output based on the generated voltage 612. The method then continues to apply power and monitor the voltages 602. In an alternate embodiment of the present disclosure, the methods illustrated by FIGS. 5 and 6 can be performed with respect to an information handling system simultaneously.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a power supply having a positive remote sense input;
   a pull-down circuit having at least two inputs and an output, the output conductively coupled to provide a first voltage to the positive remote sense input of the power supply;
   a first load position coupled to the power supply and conductively coupled to provide a second voltage to the first input of the pull-down circuit; and
   a second load position coupled to the power supply and conductively coupled to provide a third voltage to the second input of the pull-down circuit;
   wherein the first voltage is no greater than either the second voltage or the third voltage.

2. The information handling system of claim 1, wherein the first voltage is within 1% of the lesser of the third voltage and the second voltage.

3. The information handling system of claim 1, wherein the first load position includes a plurality of expansion connectors adapted to receive expansion cards.

4. The information handling system of claim 1, wherein the second load position includes a SCSI connector capable of coupling a plurality of SCSI devices to the information handling system.

5. The information handling system of claim 1, wherein the pull-down circuit further includes first, second and third transistors, the first input coupled to provide the second voltage to an emitter of the first transistor, the second input coupled to provide the third voltage to an emitter of the second transistor, bases and collectors of the first and second transistors conductively coupled to a base of the third transistor, coupled through a resistor to a specified voltage, and coupled through a capacitor to ground, a collector of the third transistor coupled to the specified voltage, and an emitter of the third transistor coupled to provide the first voltage to the output.

6. The information handling system of claim 1, wherein the first load position is coupled to the power supply in a first circuit and the second load position is coupled to the power supply in a second circuit that is parallel to the first circuit.

7. The information handling system of claim 1, wherein the power supply includes a negative remote sense input and the first load position includes connectors, is conductively coupled to provide a second voltage to the first input of the pull-down circuit on a first side of the connectors, and is conductively coupled on a second side of the connectors to provide a fourth voltage to the negative remote sense input of the power supply.

8. The information handling system of claim 1, wherein the power supply has a positive terminal and the positive terminal is coupled to the first load position through cables and PCB layout.

9. The information handling system of claim 1, wherein the pull-down circuit further includes first and second operational amplifiers each having an output and positive and negative inputs, the first input coupled to provide the second voltage to the positive input of the first operational amplifier, the second input coupled to provide the third voltage to the positive input of the second operational amplifier, the output of each operational amplifier coupled to the negative input of the same operational amplifier through a diode, and the negative inputs of the operational amplifiers conductively coupled to each other, to the output of the pull-down circuit and to a specified voltage through a resistor.

10. A method for providing a feedback voltage to a power supply, comprising the steps of:
    applying power from a power supply to a first load position and a second load position;
    conductively coupling a first voltage from the first load position to a first input of a pull-down circuit;
    conductively coupling a second voltage from the second load position to a second input of the pull-down circuit;
    generating a third voltage at an output of the pull-down circuit that is no greater than either the first voltage or the second voltage;
    coupling the third voltage to a remote sense input of the power supply; and
    adjusting a parameter of the power applied by the power supply based on the third voltage.

11. The method of claim 10, wherein the third voltage is within 1% of the lesser of the first voltage and the second voltage.

12. The method of claim 10, the first load position includes a plurality of expansion connectors adapted to receive expansion cards.

13. The method of claim 10, wherein the second load position includes a SCSI connector capable of coupling to a plurality of SCSI devices.

14. The method of claim 10, further comprising the steps of:
    coupling the first voltage from the first input of the pull-down circuit to an emitter of a first transistor;
    coupling the second voltage from the second input of the pull-down circuit to an emitter of a second transistor;
    coupling bases and collectors of the first and second transistors to a base of a third transistor, through a resistor to a specified voltage, and through a capacitor to ground;
    coupling a collector of the third transistor to the specified voltage; and
    coupling an emitter of the third transistor to provide the third voltage to the output.

15. The method of claim 10, further comprising the steps of:
    coupling the first load position to the power supply in a first circuit; and coupling the second load position to the power supply in a second circuit that is parallel to the first circuit.

16. The method of claim 10, wherein the power supply remote sense input is a positive remote sense input, the power supply includes a negative remote sense input, the first load position includes connectors, the first voltage is a voltage on a first side of the connectors, a fourth voltage is a voltage on a second side of the connectors and further comprising the steps of:

coupling the fourth voltage to the negative remote sense input of the power supply.

17. The method of claim 10, wherein the power supply has a positive terminal and the step of applying power to the first load position includes providing current to the first load position through cables and PCB layout.

18. The method of claim 10, further comprising the steps of:

coupling the first voltage from the first input of the pull-down circuit to a positive input of a first operational amplifier;

coupling the second voltage from the second input of the pull-down circuit to a positive input of a second operational amplifier;

coupling an output of each operational amplifier through a diode to a negative input of the same operational amplifier; and coupling the negative inputs of the operational amplifiers to each other, to the output of the pull-down circuit, and to a specified voltage through a resistor.

19. The method of claim 10, wherein the adjusted parameter is voltage.

20. An information handling system, comprising:

a power supply having positive and negative terminals and a remote sense input;

a first load position coupled to a first circuit including the positive and negative terminals of the power supply, the first load position including a connector capable of connecting to and disconnecting from devices;

a second load position coupled to a second circuit including the positive and negative terminals of the power supply, at least a portion of the second circuit parallel to at least a portion of the first circuit, the second load position including a connector capable of connecting to and disconnecting from devices; and a sense module having first and second inputs and an output, the first input coupled to the first load position on a side of the connector closest to the positive terminal of the power supply, the second input coupled to the second load position on a side of the connector closest to the positive terminal of the power supply, the output coupled to the remote sense input of the power supply, a voltage at the output equal to or less than the lesser of a voltage at the first input and a voltage at the second input, and the voltage at the output within 1% of the lesser of the input voltages.

21. The information handling system of claim 20, further comprising:

a first conductor coupled between the positive terminal and the first load position; and a second conductor coupled between the positive terminal and the second load position;

and wherein a voltage drop of greater than 1% of the voltage between the positive and negative terminals of the power supply exists across both conductors.

* * * * *